(12) United States Patent
Kamei et al.

(10) Patent No.: US 10,569,703 B2
(45) Date of Patent: Feb. 25, 2020

(54) STEERING WHEEL

(71) Applicant: TOYODA GOSEI CO., LTD., Kiyosu-shi, Aichi-ken (JP)

(72) Inventors: Shunsuke Kamei, Kiyosu (JP); Yoshio Mizuno, Kiyosu (JP); Hayato Abo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/439,836

(22) Filed: Jun. 13, 2019

(65) Prior Publication Data

US 2020/0001782 A1    Jan. 2, 2020

(30) Foreign Application Priority Data

Jun. 27, 2018 (JP) .................................. 2018-122361

(51) Int. Cl.
| | |
|---|---|
| *F21V 21/00* | (2006.01) |
| *B60Q 3/283* | (2017.01) |
| *B60Q 3/64* | (2017.01) |
| *B62D 1/06* | (2006.01) |
| *F21V 8/00* | (2006.01) |

(52) U.S. Cl.
CPC .............. *B60Q 3/283* (2017.02); *B60Q 3/64* (2017.02); *B62D 1/06* (2013.01); *G02B 6/0043* (2013.01); *G02B 6/0051* (2013.01)

(58) Field of Classification Search
CPC . B60Q 3/283; B60Q 3/64; B62D 1/06; G02B 6/0043; G02B 6/0051
USPC .................................................. 362/511, 488
See application file for complete search history.

(56) References Cited

U.S. PATENT DOCUMENTS

| 10,053,132 B2 * | 8/2018 | Pitzer ..................... B60Q 3/283 |
| 10,246,012 B2 * | 4/2019 | Asakawa ................. B60Q 3/80 |
| 10,414,439 B2 * | 9/2019 | Spencer ................... B62D 1/06 |
| 2006/0070795 A1 * | 4/2006 | Meissner ............... B60K 37/06 180/446 |
| 2014/0328077 A1 * | 11/2014 | Tovar .................... B62D 1/046 362/511 |
| 2015/0123947 A1 * | 5/2015 | Jubner ................... B62D 1/046 345/175 |
| 2016/0311366 A1 * | 10/2016 | Lisseman ............. G02B 6/0085 |
| 2017/0166116 A1 | 6/2017 | Asakawa et al. |

FOREIGN PATENT DOCUMENTS

| JP | 2004-148911 A | 5/2004 |
| JP | 2017-109521 A | 6/2017 |
| WO | WO 2017/116898 | * 7/2017 |

* cited by examiner

Primary Examiner — Laura K Tso
(74) Attorney, Agent, or Firm — Posz Law Group, PLC (57) ABSTRACT

A steering wheel includes a gripping portion that is gripped by a driver when a conveyance is steered, a light source that is disposed inside the gripping portion and is configured to emit light, a light guide body that is disposed inside the gripping portion such that an end portion of the light guide body faces the light source, the light guide body including an emission surface that is configured to emit light from the light source and incident on the end portion and that is formed on a surface on a driver side, and a covering portion that surrounds the light guide body and forms an outer layer portion of at least a part of the gripping portion around the light guide body. The covering portion is formed with a hole, through which light emitted from the emission surface passes.

3 Claims, 5 Drawing Sheets

STEERING WHEEL

CROSS-REFERENCE TO RELATED APPLICATION

This application claims priority from Japanese Patent Application No. 2018-122361, filed on Jun. 27, 2018, the entire subject matter of which is incorporated herein by reference.

TECHNICAL FIELD

The present invention relates to a steering wheel that is operated when steering a conveyance which is a vehicle or the like, and more particularly, to a steering wheel having a function of presenting information by light.

BACKGROUND ART

JP-A-2017-109521 describes a steering wheel of a conveyance which is a vehicle or the like and having a function of presenting information by light. In the steering wheel, a light source is disposed in a ring portion that is gripped and operated when the vehicle is steered. Further, in the ring portion, a light guide body is disposed such that an end portion of the light guide body faces the light source. An emission surface, which emits light from the light source and incident on the end portion, is formed on a surface of the light guide body on a driver side. Further, a cover that covers the light guide body is disposed in the ring portion in an exposed state.

According to the above-described steering wheel, when the light source emits light, the light is diffused by the light guide body and is emitted from the emission surface of the light guide body. The light passes through the cover and is emitted from the ring portion. Therefore, various kinds of information relating to driving of the vehicle can be presented to the driver by the light.

A portion of the ring portion where a cover is exposed is smoother and more slippery compared to a portion where the cover is not exposed. Therefore, when the ring portion is gripped, an amount of friction generated between the portion where the cover is exposed and a palm is different from an amount of friction generated between the portion where the cover is not exposed and the palm, which would deteriorate touch feeling of the ring portion.

Further, when the ring portion is irradiated with external light, the portion where the cover is exposed in the ring portion appears brighter than the portion where the cover is not exposed, which would deteriorate an appearance of the ring portion.

These problems may occur in a steering wheel of a conveyance other than a vehicle or a steering wheel that presents information at a portion other than the ring portion, as long as the steering wheel presents information by light at a portion (gripping portion) gripped by a driver during steering of a conveyance.

SUMMARY

The present invention has been made in view of the above circumstances, and an aspect of the present invention is to provide a steering wheel capable of improving touch feeling and an appearance of the gripping portion.

According to an embodiment of the present invention, there is provided a steering wheel including: a gripping portion that is gripped by a driver when a conveyance is steered; a light source that is disposed inside the gripping portion and is configured to emit light; a light guide body that is disposed inside the gripping portion such that an end portion of the light guide body faces the light source, the light guide body including an emission surface that is configured to emit light from the light source and incident on the end portion and that is formed on a surface on a driver side; and a covering portion that surrounds the light guide body and forms an outer layer portion of at least a part of the gripping portion around the light guide body. The covering portion is formed with a hole, through which light emitted from the emission surface passes.

According to the above configuration, when the light source in the gripping portion emits light, the light enters the light guide body from the end portion of the light guide body. The light is diffused by the light guide body and is emitted from the emission surface toward the driver. The light is emitted from the gripping portion through the hole in the covering portion. With the light, various kinds of information relating to driving of the conveyance is presented to the driver.

When the conveyance is steered, the gripping portion is gripped. The outer layer portion of at least a part of the gripping portion around the light guide body is formed by the covering portion. The palm contacts the covering portion when the gripping portion is gripped. The covering portion surrounds the light guide body. Therefore, in the gripping portion, the friction generated between the gripping portion and the palm when the gripping portion is gripped is reduced or prevented from greatly varying in the direction in which the covering portion surrounds the at least the light guide body. Further, when the gripping portion is irradiated with external light from an outside of the gripping portion, the covering portion is irradiated with most of the external light. The external light enters the inside of the covering portion only through the hole. Therefore, the external light is reduced or prevented from being reflected on the inside of the covering portion and shining.

The steering wheel may further include a cover that is disposed between the light guide body and the covering portion and is configured to transmit light emitted from the emission surface. A surface of the cover on the driver side may be formed to be rougher than another surface of the cover.

The steering wheel may further include a cover that is disposed between the light guide body and the covering portion and is configured to transmit light emitted from the emission surface, and a light diffusion sheet that is disposed between the cover and the covering portion. At least a surface of the light diffusion sheet on the driver side may be formed to be rougher than the surface of the cover on the driver side.

According to the above configuration, when the light source in the gripping portion emits light, the light is diffused by the light guide body and emitted from the emission surface, and then passes through the cover. At this time, when the surface of the cover on the driver side is formed to be rough, the light passes through the rough surface. When the light diffusion sheet is disposed instead of the rough surface, light emitted from the emission surface of the light guide body passes through the cover and the light diffusion sheet. As described above, light, which has passed through the rough surface of the cover or the light diffusion sheet, passes through the hole of the covering portion and is emitted from the gripping portion. With the light, various kinds of information relating to driving of the conveyance is presented to the driver.

Incidentally, the hole is formed in the covering portion, so that a member of the gripping portion on the inner side of the covering portion can be seen through the hole from the outside of the gripping portion, which might deteriorate appearance quality of the gripping portion. In this respect, according to the above configuration, the surface of the cover on the driver side, that is, the surface adjacent to the covering portion may be formed to be rough. Alternatively, a light diffusion sheet may be disposed between the surface of the cover on the driver side and the covering portion. At least the surface of the light diffusion sheet on the driver side may be formed to be rougher than the surface of the cover on the driver side.

Therefore, as compared with a case where the surface of the cover on the driver side is formed to be smooth and slippery, or a case where the light diffusion sheet is not disposed between the surface of the cover on the driver side and the covering portion, the members of the gripping portion inside the covering portion are more difficult to be seen from the outside of the gripping portion through the hole.

When the cover is exposed at the gripping portion, external light is reflected by the cover. Therefore, the cover appears bright from the outside of the gripping portion. In this respect, according to the above configuration, the covering portion covers the cover. In addition, a hole is formed at a plurality of positions of the covering portion. The cover is irradiated with external light only through the hole. Therefore, an amount of the external light with which the cover is irradiated decreases. Accordingly, an amount of the external light reflected by the cover also decreases, so that a phenomenon of light shining due to reflection of the external light by the cover is reduced or prevented.

According to the above-described steering wheel, the touch feeling and the appearance of the gripping portion can be improved.

DESCRIPTION OF EMBODIMENTS

First Embodiment

Hereinafter, a steering wheel for a vehicle according to a first embodiment is described with reference to FIGS. 1 to 7B.

Figure 1:
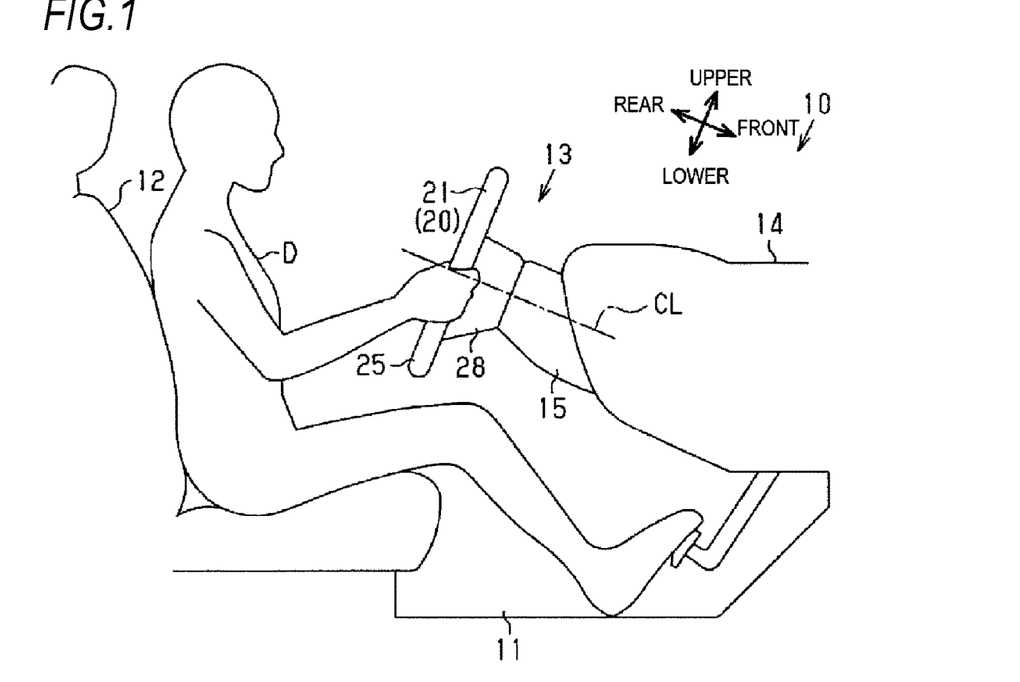
FIG. 1 is a schematic side view illustrating a steering wheel for a vehicle according to a first embodiment along with peripheral portions of the steering wheel.

As illustrated in FIG. 1, in front of a driver seat 12 in a vehicle interior 11, a steering device 13 operated by a driver D is provided so as to change a traveling direction of a vehicle 10 which is an example of a conveyance. The steering device 13 includes a steering column 15 attached to a vehicle body 14 and a steering wheel 20 rotatably disposed on a rear side of the steering column 15. A steering shaft (not illustrated) that is configured to transmit rotation of the steering wheel 20 to a steering gear box (not illustrated) is disposed in the steering column 15. The steering shaft is disposed in a state of being inclined so as to be higher toward the rear side and rotates about a central axis line CL.

In the present specification, when each part of the steering wheel 20 is described, the central axis line CL is used as a reference. A direction along the central axis line CL is referred to as a "front-rear direction" of the steering wheel 20, and an upright direction of the steering wheel 20 in directions along a plane orthogonal to the central axis line CL is referred to as an "upper-lower direction". Therefore, the front-rear direction and the upper-lower direction of the steering wheel 20 are slightly inclined with respect to a front-rear direction (horizontal direction) and an upper-lower direction (vertical direction) of the vehicle 10. Further, a direction orthogonal to both the "front-rear direction" and the "upper-lower direction" is defined as a left-right direction of the steering wheel 20.

Figure 2:
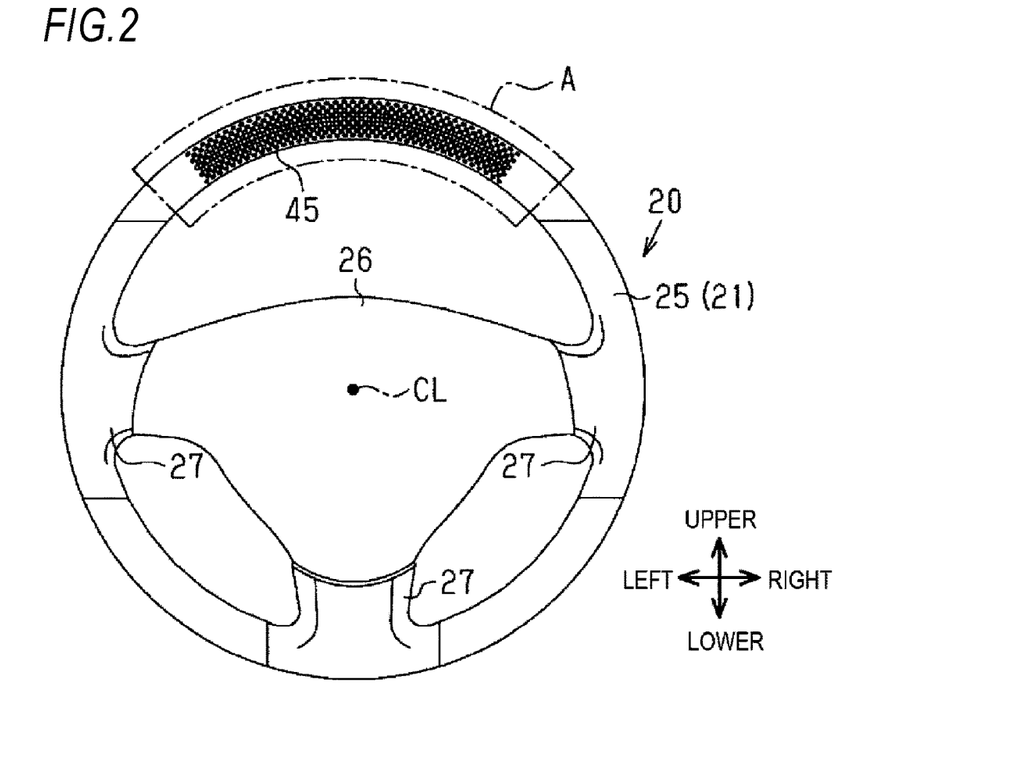
FIG. 2 is a front view of the steering wheel according to the first embodiment.

FIG. 2 is a front view of the steering wheel 20 as viewed from rear and illustrates the steering wheel 20 in a steering reference state (straight-ahead steering of the vehicle 10) in which a steering angle is zero degree.

As illustrated in FIGS. 1 and 2, the steering wheel 20 includes a ring portion (also referred to as a handle portion, a rim portion) 21 serving as a gripping portion, a pad portion 26, and a spoke portion 27. The ring portion 21 is a portion that is gripped and rotated (steered) by the driver D, and has a substantially annular shape centering on the central axis line CL. The pad portion 26 is disposed in a space surrounded by the ring portion 21. A front portion of the pad portion 26 is formed by a lower cover 28. The spoke portion 27 is provided at a plurality of positions between the ring portion 21 and the pad portion 26.

In order to specify a position of the ring portion 21 in a rotation direction (circumferential direction about the center axis line CL), in the present specification, "upper", "lower", "left" and "right" are defined based on the steering reference state.

Figure 5:
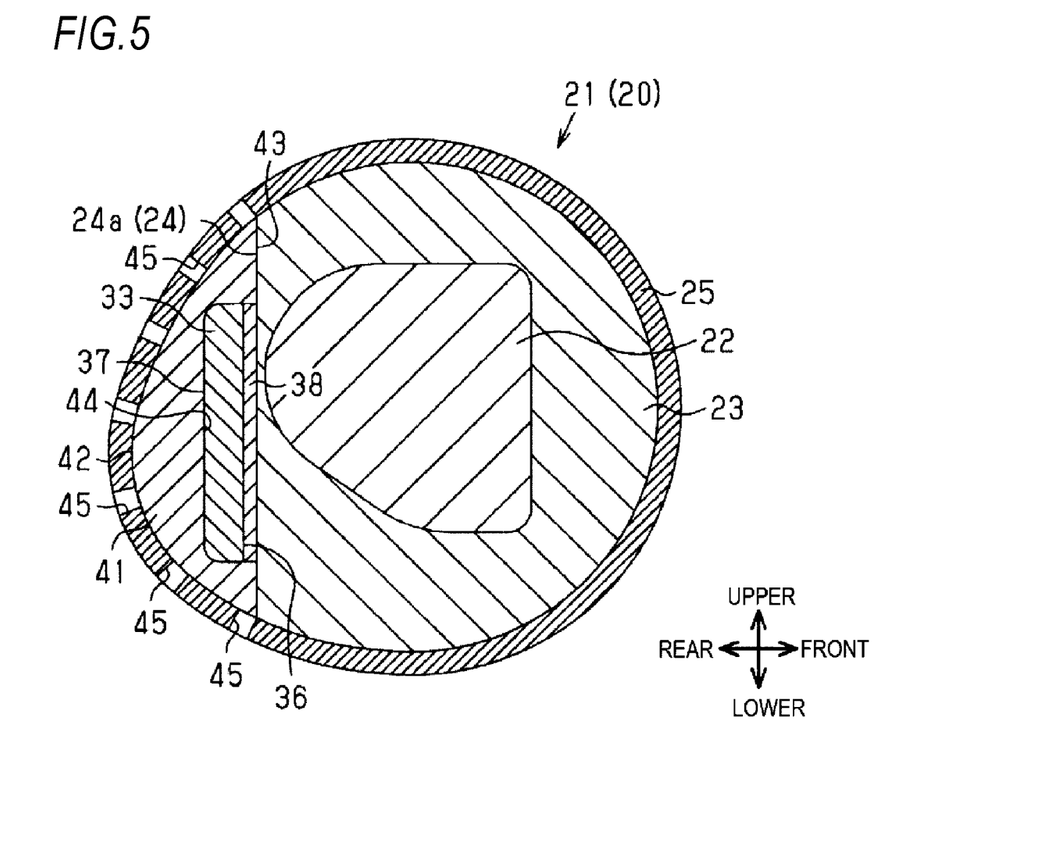
FIG. 5 is a cross-sectional view taken along a line 5-5 in FIG. 4.
Figure 6:
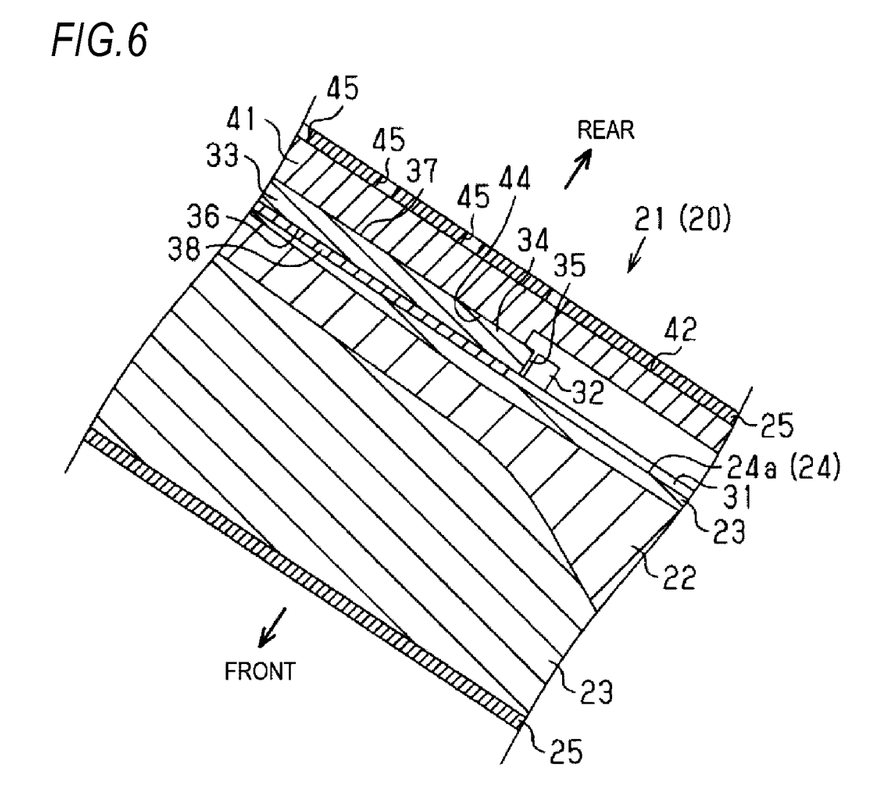
FIG. 6 is a cross-sectional view taken along a line 6-6 in FIG. 4.

A core metal formed of iron, aluminum, magnesium, an alloy thereof, or the like is disposed inside each of the ring portion 21, the spoke portion 27, and the pad portion 26 of the steering wheel 20. Among these core metals, as illustrated in FIGS. 5 and 6, one located in the ring portion 21 is referred to as a ring portion core metal 22. The ring portion core metal 22 forms a frame portion of the ring portion 21.

A soft covering portion 23 formed of a soft (elastic) material which is foamed polyurethane or the like is provided around the ring portion core metal 22. The soft cover portion 23 is integrally formed with the ring portion core metal 22 by insert molding or the like.

Figure 3:
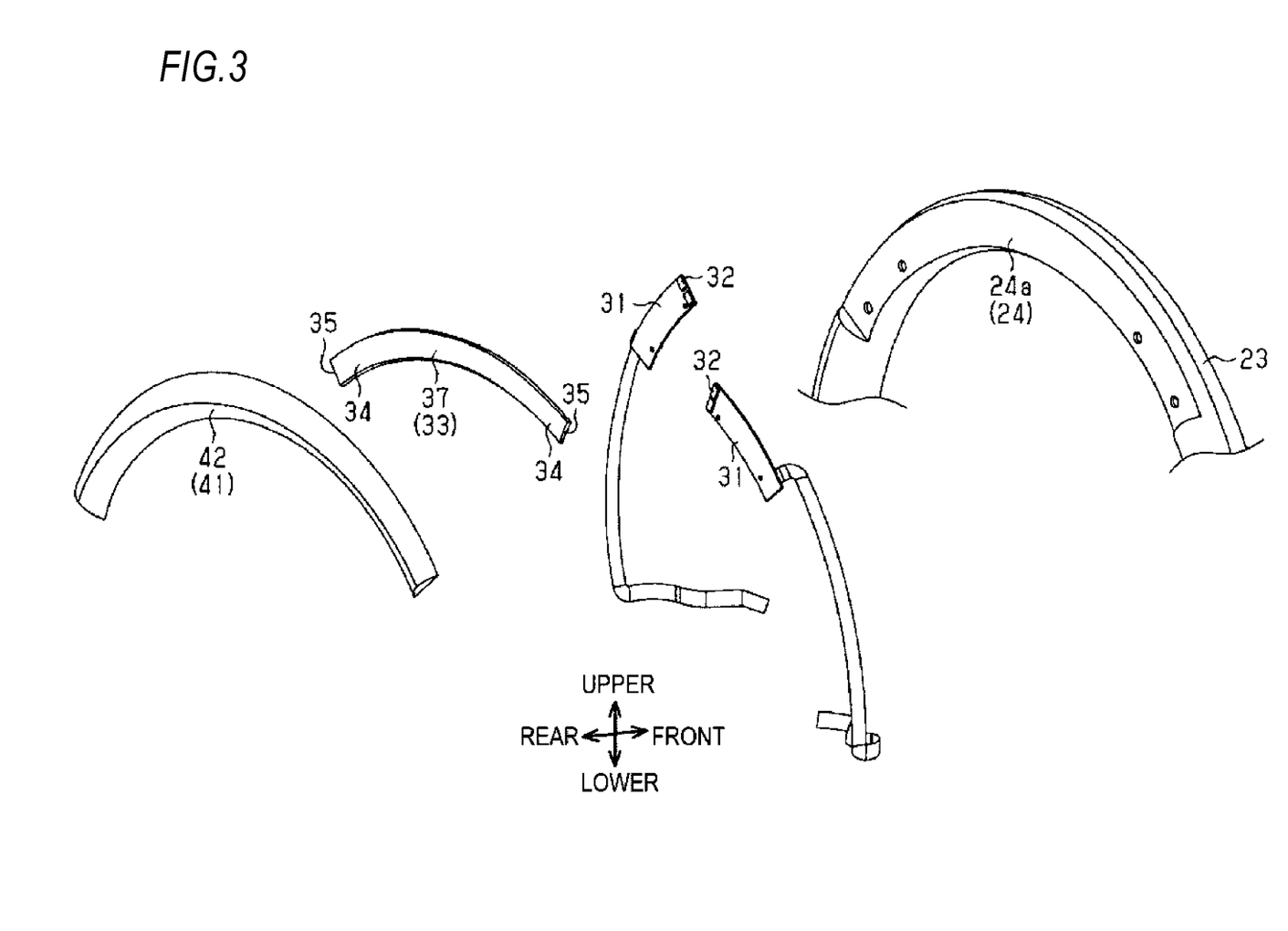
FIG. 3 is an exploded perspective view illustrating a part of the constituent members of the steering wheel according to the first embodiment.

As illustrated in FIGS. 3, 5 and 6, a cutout portion 24 is formed in the soft covering portion 23. The cutout portion 24 is formed in the rear side of the soft covering portion 23 in the front-rear direction. The cutout portion 24 is formed in the upper side of the soft covering portion 23 in the upper-lower direction. The cutout portion 24 has an attachment surface 24a that satisfies following conditions.

Condition 1: The attachment surface 24a has an arc shape along the soft covering portion 23 when the steering wheel 20 is viewed from the rear.

Condition 2: The attachment surface 24a is formed by a flat surface orthogonal to the central axis line CL when the steering wheel 20 is viewed from a side.

A surface layer 25 serving as a covering portion forming an outer layer portion of the ring portion 21 is attached around the soft covering portion 23 by winding or the like. In FIG. 3, an illustration of the surface layer 25 is omitted. As the surface layer 25, for example, natural leather, synthetic leather, artificial leather or the like can be used.

As illustrated in FIGS. 3 and 6, substrates 31 are respectively disposed at two upper portions inside the ring portion 21 in the steering reference state, which are spaced apart from each other in the rotation direction of the ring portion 21. Each of the substrates 31 is disposed on the attachment surface 24a. A light source 32 is mounted on each of the substrates 31. As the light source 32, for example, a light emitting element which is a light emitting diode (LED) or a semiconductor laser diode or the like can be used.

A plate-shaped light guide body 33 having a circular arc shape when viewed from rear of the steering wheel 20 is disposed in an upper portion of the ring portion 21 between the two light sources 32. The light guide body 33 is formed of a transparent resin material having light transmissivity in a wavelength range of light emitted from the light source 32, for example, an acrylic resin which is PMMA (polymethyl methacrylate resin) or the like.

As illustrated in FIGS. 5 and 6, a bottom plate 38 colored in white or the like is disposed between the light guide body 33 and the attachment surface 24a of the soft covering portion 23. The bottom plate 38 is configured to reduce or prevent the member (soft covering portion 23) located in front of the bottom plate 38 from being seen through a cover 41, the light guide body 33 or the like.

As illustrated in FIGS. 3 and 6, both end portions 34 of the light guide body 33 in the rotation direction of the ring portion 21 face the nearest light source 32. Each of the end portions 34 includes an incident surface 35 of light emitted from the light source 32 which face the end portion 34. A plurality of diffusion portions (not illustrated) having a dot shape are formed by printing or the like in substantially an entire region of a front surface 36 of the light guide body 33 and at a plurality of positions spaced apart from one another. The light emitted from each of light sources 32 is incident on the light guide body 33 through the incident surface 35 which face the light source 32 and is diffused by diffuse reflection or the like by the diffusion portions. A rear surface, which is a surface of the light guide body 33 on a driver D side, forms an emission surface 37 of light. Light diffused as described above is emitted from the emission surface 37 to the outside of the light guide body 33.

As illustrated in FIGS. 3, 5 and 6, a cover 41 that is configured to transmit light emitted from the emission surface 37 is disposed on a rear side of the attachment surface 24a of the cutout portion 24 and between the light guide body 33 and the bottom plate 38, and the surface layer 25. Similar to the light guide body 33 described above, the cover 41 is formed of a transparent resin material having light transmissivity in a wavelength range of light emitted from the light source 32, which is the acrylic resin or the like. Here, the term "transparent" includes not only colorless transparent but also colored transparent.

A rear surface 42, which is a surface of the cover 41 on the driver D side, is curved to bulge rearward. The rear surface 42 is formed by a smooth and slippery surface. A part of a front surface 43 of the cover 41 is formed by a flat surface. A housing recess 44, which is open at the front surface 43 of the cover 41 and is recessed rearward, is formed in the cover 41. The light guide body 33 and the bottom plate 38 are disposed between the housing recess 44 and the attachment surface 24a of the cutout portion 24 in a state of being overlapped in the front-rear direction. In other words, the cover 41 fills a space between the light guide body 33 and the bottom plate 38, and the cover 25.

Figure 4:
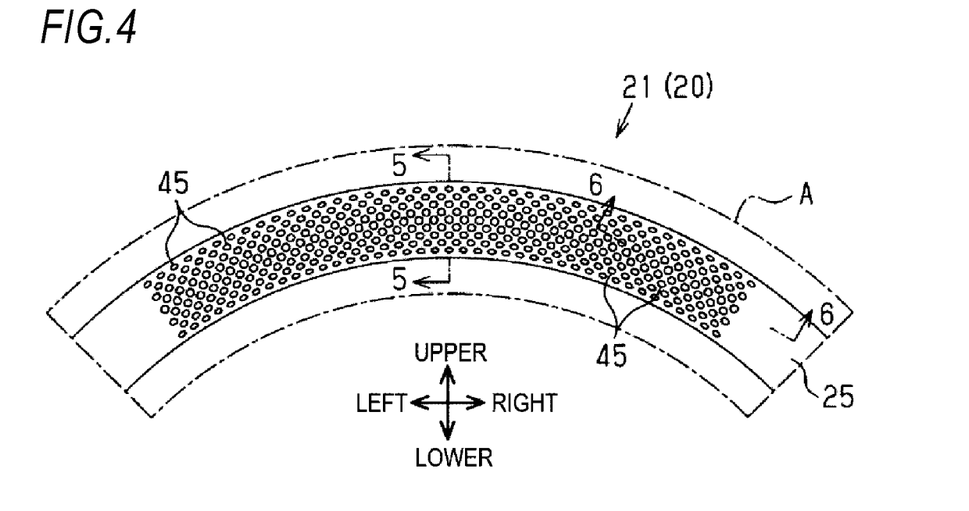
FIG. 4 is an enlarged partial front view of a portion A in FIG. 2.

As illustrated in FIGS. 4 to 6, the surface layer 25 is formed with holes 45 in a penetrating state at a plurality of positions spaced apart from one another in a region in contact with the cover 41. Light emitted from the emission surface 37 of the light guide body 33 and transmitted through the cover 41 pass through the holes 45. These holes 45 can be formed by performing punching process or laser drilling process or the like. The punching process is a processing method of physically forming the hole 45 in the surface layer 25 by pressing a blade against a corresponding position of the surface layer 25 and punching. The laser drilling process is a non-contact processing method in which the hole 45 is formed in the surface layer 25 by irradiating a corresponding position of the surface layer 25 with laser light and welding and burning fibers of the surface layer 25 with heat.

Figure 7A:
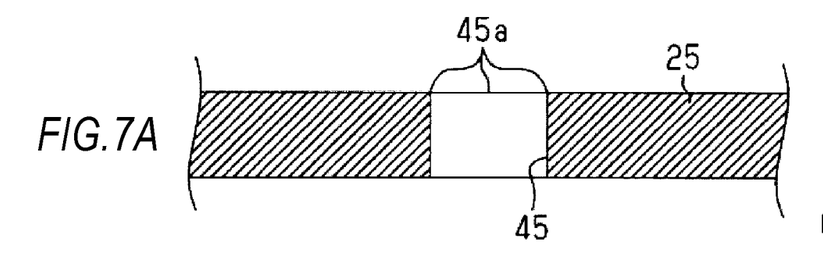
FIGS. 7A and 7B are enlarged partial cross-sectional views illustrating a peripheral part of a hole in a surface layer according to the first embodiment.

FIG. 7A illustrates a peripheral portion of the hole 45 in a case where the hole 45 is formed in the surface layer 25 by the laser drilling process. According to this processing method, the inner diameter is uniform in the thickness direction of the surface layer 25 (upper-lower direction in FIG. 7A), and it is possible to form a neat hole 45 with a little unevenness on an inner wall surface.

Figure 7B:
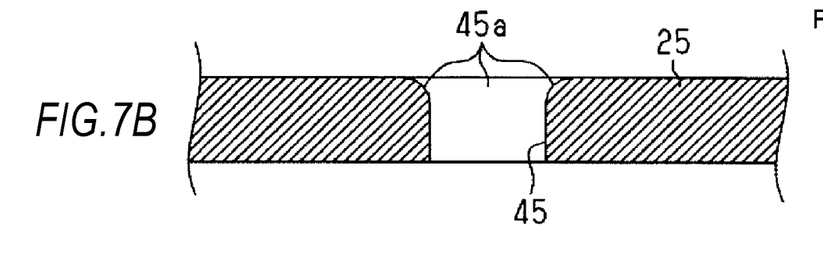

FIG. 7B illustrates a peripheral portion of the hole 45 in a case where the hole 45 is formed in the surface layer 25 by the punching process. According to this processing method, a corner portion 45a on a side (upper side in FIG. 7B) to which the blade is pressed is formed on a gentle surface whose diameter increases toward an end surface side in the thickness direction (upper-lower direction in FIG. 7B) of the surface layer 25. Further, slight unevenness may occur on the inner wall surface of the hole 45.

Therefore, in terms of appearance quality, the hole 45 formed by the laser drilling process may be superior to the hole 45 formed by the punching process. Such a tendency appears regardless of hardness of the surface layer 25.

On the other hand, in a case of forming the hole 45 by the laser drilling process, when the driver D grips the ring portion 21, a finger may be caught by the corner portion 45a and affect a rotation operation of the ring portion 21. In contrast, in a case of forming the hole 45 by the punching process, a finger of the driver D is less likely to be caught by the corner portion 45a. Such a tendency appears strongly when a hard material is used as the surface layer 25.

Therefore, when a soft material is used as the surface layer 25, the hole 45 may be formed by the laser drilling process. When a hard material is used as the surface layer 25, the hole 45 may be formed by the punching process.

A control device (not illustrated) that is configured to control the light source 32 is disposed in the pad portion 26 illustrated in FIG. 2. The control device is electrically connected to the light source 32 via the substrate 31 or the like, and is configured to control a light emission mode which is a light amount, a color or the like through a control of the light source 32 based on a signal from a sensor or the like.

Next, operational effects of the above-described steering wheel 20 according to the first embodiment are described.

As illustrated in FIGS. 3, 5 and 6, when each of the light sources 32 in the ring portion 21 emits light, the light is incident to an inside of the light guide body 33 through the incident surface 35 of each end portion 34 of the light guide body 33 facing the light source 32. The incident light is diffused in various directions by hitting the diffusion portion of the front surface 36 of the light guide body 33 to change a direction, or the like. The diffused light is emitted from the emission surface 37 on a rear side of the light guide body 33 to an outside of the light guide body 33, so that the entire light guide body 33 emits light uniformly. After passing through the cover 41, the light is emitted from the ring portion 21 through the plurality of holes 45 of the surface layer 25 to brighten surroundings of the hole 45. With the light, various kinds of information relating to driving of the vehicle 10 can be presented to the driver D. For example, when an awake state of the driver D is monitored and a non-awake state (dozing state) is detected while the vehicle 10 is traveling, the driver D can be warned that the driver D is in the non-awake state by turning on or blinking the light source 32.

When the vehicle 10 is steered, the ring portion 21 is gripped by the driver D. An outer layer portion of the ring portion 21 is formed by the surface layer 25, and a palm is in contact with the surface layer 25. The surface layer 25 surrounds the light guide body 33. Therefore, in the ring portion 21, friction generated between the ring portion 21 and the palm when the ring portion 21 is gripped can be reduced or prevented from greatly varying in a direction in which the surface layer 25 surrounds the light guide body 33 and in the rotation direction of the ring portion 21.

Further, when the cover 41 is exposed as described in JP-A-2017-109521, if the cover 41 is directly irradiated with external light, the entire rear surface 42 of the cover 41 appears bright from the outside of the ring portion 21, which would deteriorate the appearance quality of the ring portion 21. In this respect, in the first embodiment in which the cover 41 is covered by the surface layer 25 including the plurality of holes 45, when the ring portion 21 is irradiated with external light, the surface layer 25 is irradiated with most of the external light. The cover 41 is irradiated with external light only through the hole 45. As a result, an amount of the external light with which the cover 41 is irradiated decreases, and accordingly, an amount of the external light reflected by the cover 41 also decreases. Therefore, it is possible to reduce or prevent a phenomenon of light shining due to reflection of the external light by the cover 41 to reduce or prevent the deterioration of the appearance quality of the ring portion 21 due to the phenomenon.

Here, it is possible to illuminate the ring portion 21 by arranging a plurality of light sources along the rotation direction of the ring portion 21 without using the light guide body 33 and causing these light sources to emit light. However, in this case, luminance unevenness may occur among the light sources, and illumination quality may be deteriorated. In this respect, in the first embodiment, the light guide body 33 is used in addition to the light source 32 and light emitted from the light source 32 is diffused by the light guide body 33, so that the entire light guide body 33 can be uniformly illuminated. It is possible to reduce the luminance unevenness to reduce or prevent the deterioration of the illumination quality.

Further, in JP-A-2017-109521, the cover 41 is bare (exposed), so that the entire cover 41 can be seen, which may deteriorate the appearance quality of the ring portion 21. In this respect, in the first embodiment, all the members (the light source 32, the light guide body 33, the bottom plate 38, and the cover 41) involved in illumination are covered with the surface layer 25. The surface layer 25 is formed only with the hole 45. Therefore, the cover 41, the light guide body 33, the bottom plate 38, or the like can be seen only through the hole 45, so that it is possible to reduce or prevent the deterioration of the appearance quality as described above.

According to the first embodiment, the following effects can be obtained in addition to the above.

Light that is emitted from the light source 32 and is incident and transmitted in the light guide body 33 through the incident surface 35 of each end portion 34 attenuates as the light goes away from the light source 32 in the rotation direction of the ring portion 21. However, in the first embodiment, the light sources 32 are disposed at positions facing the two end portions 34 of the light guide body 33 in the rotation direction of the ring portion 21. Therefore, the entire light guide body 33 can be uniformly illuminated. This effect is more effective as the length of the light guide body 33 in the rotation direction of the ring portion 21 is longer.

Since a wide range can be irradiated with a small number of the light sources 32 by using the light guide body 33, the number of the light sources 32 can be reduced.

For example, when the light guide body 33 is omitted and the light sources 32 are arranged along the rotation direction of the ring portion 21, a large number of light sources 32 are required. In particular, when a change in color is expressed by the light source 32 itself, it is necessary to mount at least two types (two colors) of the light sources 32 at each mounting position. Therefore, in this case, the number of the light sources 32 increases, a space for mounting the light sources 32 increases, and power consumption of the light sources 32 increases.

In contrast, when the light guide body 33 is used as in the first embodiment, it is possible to change a color emitted from the emission surface 37 of the light guide body 33 only by mounting two types (two colors) of the light source 32. The number of the light sources 32 can be reduced compared with the case where the light guide body 33 is not used. Therefore, cost of the steering wheel 20 can be reduced, and the power consumed to turn on the light sources 32 can be reduced. Further, the space for mounting the light sources 32 can be reduced.

A luminance of the light guide body 33 can be changed by changing a light amount of each light source 32. A color of light emitted from the emission surface 37 of the light guide body 33 can be changed by changing a color of light emitted by the light source 32. Further, the light guide body 33 can be blinked by repeatedly turning on and off the light source 32.

By appropriately controlling the light emission mode (light amount, color, or the like) of the light source 32 by the control device, it is possible to change the color, the luminance, the blinking and a light emission region in the light guide body 33 of light emitted from the emission surface 37 of the light guide body 33, and to further express a flow of light in the light guide body 33. In this way, various kinds of information relating to driving of a vehicle can be presented in the ring portion 21 by changing the light emission mode of the light guide body 33.

For example, when warning information is presented, a degree or a direction of a warning can be notified by changing the color, the luminance, the blinking, or the flow of light emitted from the emission surface 37 of the light guide body 33. It is possible to present a required steering angle of the steering wheel 20 at a time of parking or the like by using the flow of light. Further, it is possible to guide a line of sight of the driver D to a meter panel or the like disposed in the vehicle 10 using the flow of light.

Second Embodiment

Figure 8:
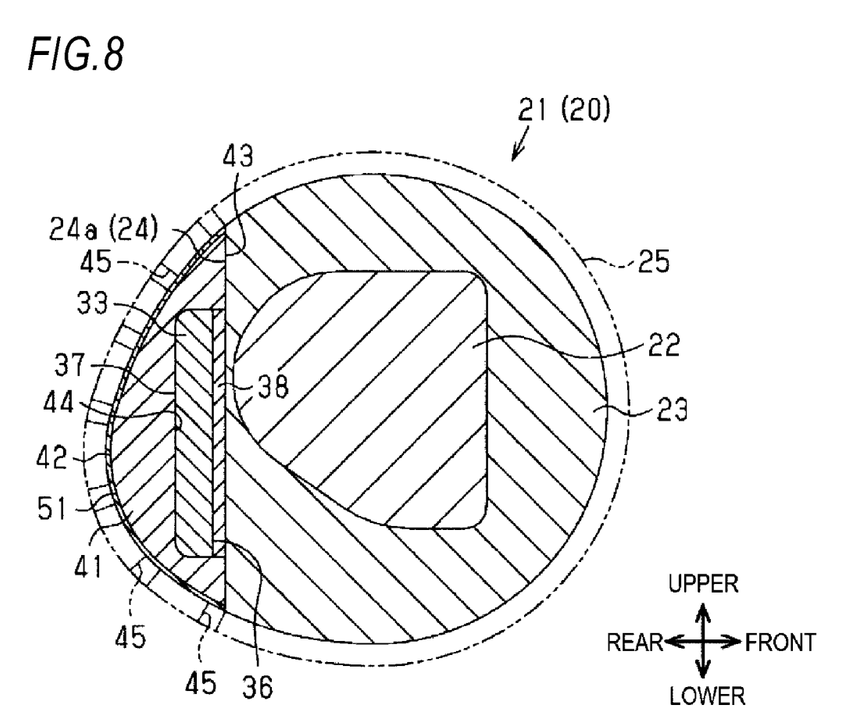
FIG. 8 is a cross-sectional view corresponding to FIG. 5 and illustrating a steering wheel for a vehicle according to a second embodiment.

Next, a steering wheel for a vehicle according to a second embodiment is described with reference to FIG. 8.

In the second embodiment, in addition to configurations of the first embodiment, a light diffusion sheet 51 is disposed between the rear surface 42 of the cover 41 and the surface layer 25. The light diffusion sheet 51 has transparency to light that passes through the cover 41. At least a rear surface, which is a surface of the light diffusion sheet 51 on the driver D side, is formed to be rougher than the rear surface 42 of the cover 41. The configurations other than the above are the same as those of the first embodiment. Therefore, the same elements as those described in the first embodiment are denoted by the same reference numerals, and repetitive descriptions thereof are omitted.

According to the second embodiment, in addition to the same operational effects as those in the first embodiment, the following operational effects can be obtained.

Light emitted from the emission surface 37 of the light guide body 33 passes through the cover 41 and the light diffusion sheet 51. The light is emitted from the ring portion 21 through the hole 45 of the surface layer 25. With the light, various kinds of information relating to driving of the vehicle 10 can be presented to the driver D.

Further, as compared with a case where the rear surface 42 of the cover 41 is formed to be smooth and slippery and the light diffusion sheet 51 is not used, the members (the cover 41, the light guide body 33 and the bottom plate 38) of the ring portion 21 inside the surface layer 25 are more difficult to be seen from the outside of the ring portion 21 through the hole 45. Therefore, it is possible to reduce or prevent the deterioration of the appearance quality of the ring portion 21 due to the members inside the surface layer 25 being seen through the hole 45.

Third Embodiment

Next, a steering wheel for a vehicle according to a third embodiment is described. Although not illustrated, in the third embodiment, instead of the light diffusion sheet 51 in the second embodiment, the rear surface 42 of the cover 41 is formed as rough as the rear surface of the light diffusion sheet 51. In other words, the rear surface 42 of the cover 41 is formed rougher than a surface other than the rear surface 42 of the cover 41. In the third embodiment, the rough surface is formed by performing blast treatment on the rear surface 42 of the cover 41 as a target surface. The blast treatment is a method in which a solid metal, a mineral abrasive material or a vegetable abrasive material is sprayed onto the target surface at a high speed to roughen the target surface. The configurations other than the above are the same as those of the second embodiment.

According to the third embodiment, the same operational effects as those in the second embodiment can be obtained. That is, light emitted from the emission surface 37 of the light guide body 33 passes through the cover 41 including the rear surface 42 formed to be rough. The light is emitted from the ring portion 21 through the hole 45 of the surface layer 25. With the light, various kinds of information relating to driving of the vehicle 10 is presented to the driver D.

Further, as compared with a case where the rear surface 42 of the cover 41 is formed to be smooth and slippery (not formed to be rough), the members (the cover 41, the light guide body 33 and the bottom plate 38) of the ring portion 21 inside the surface layer 25 are more difficult to be seen from the outside of the ring portion 21 through the hole 45 of the surface layer 25. Therefore, also in the third embodiment, it is possible to reduce or prevent the deterioration of the appearance quality of the ring portion 21 due to the members inside the surface layer 25 being seen through the hole 45.

Further, each of the embodiments described above can also be implemented as a modification in which the members are changed as follows.

<Light Source 32>

As each of the light sources 32, a light source 32 that emits light of only one color may be used. In this case, as a pair of light sources 32, light sources 32 that emit light of the same color may be used, or light sources 32 that emit light of different colors may be used. In the former case, a light amount of each light source 32 can be reduced as compared with a case where the entire light guide body 33 is illuminated by one light source 32.

One of the pair of light sources 32 may be omitted.

<Light Guide Body 33>

The light guide body 33 may be formed of a transparent material which is a resin material including PC (polycarbonate resin) or PS (polystyrene resin) or the like or glass in addition to the acrylic resin.

The light guide body 33 may have a shape different from the plate shape, which is a rod shape or the like.

The length of the light guide body 33 in the rotation direction of the ring portion 21 may be changed to a length different from that in the above embodiments. For example, the light guide body 33 may be formed over an entire circumference of the ring portion 21 in the rotation direction, that is, formed in an annular shape.

The shape of the light guide body 33 as viewed from the rear may be changed to a shape (for example, a linear shape) different from a curved shape.

<Covering Portion>

The covering portion may be formed by a member different from the surface layer 25 on a condition that the cover portion surrounds the light guide body 33 and forms at least an outer layer portion of a part around the light guide body 33 in the gripping portion (ring portion 21).

The surface layer 25 may be disposed only in a part of the ring portion 21 in the rotation direction.

<Cover 41>

The light guide body 33 and the cover 41 may be integrally formed.

<Light Diffusion Sheet 51>

In addition to the surface of the light diffusion sheet 51 on the side (rear side) close to the driver D, the surface of the light diffusion sheet 51 on the side (front side) far from the driver D may be formed to be rougher than the surface (rear surface 42) of the cover 41 on the driver D side.

Other Modifications

A plurality of combinations of the light guide body 33 and the light source 32 may be provided. In this case, the light emission mode of the light guide body 33 can be changed in each combination, so that various kinds of information relating to driving of the vehicle 10 can be presented in more light emission modes.

The light source 32, the light guide body 33, the bottom plate 38, the cover 41, the hole 45 of the surface layer 25, or the like may be disposed at a position different from the upper portion of the ring portion 21.

The light source 32, the light guide body 33, the bottom plate 38, the cover 41, the hole 45 of the surface layer 25, or the like may be provided at a position different from the ring portion 21 of the steering wheel 20, which is the spoke portion 27 or the pad portion 26 or the like.

The steering wheel is not limited to be applied to a vehicle, and can be applied as a steering wheel of a steering device in another conveyance which is an aircraft or a ship or the like. The vehicle includes not only a private vehicle but also various industrial vehicles.

What is claimed is:

1. A steering wheel comprising:
    a gripping portion that is gripped by a driver when a conveyance is steered;
    a light source that is disposed inside the gripping portion and is configured to emit light;
    a light guide body that is disposed inside the gripping portion such that an end portion of the light guide body faces the light source, the light guide body including an emission surface that is configured to emit light from the light source and incident on the end portion and that is formed on a surface on a driver side; and
    a covering portion that surrounds the light guide body and forms an outer layer portion of at least a part of the gripping portion around the light guide body,
    wherein the covering portion is formed with a hole, through which light emitted from the emission surface passes.

2. The steering wheel according to claim 1, further comprising:
    a cover that is disposed between the light guide body and the covering portion and is configured to transmit light emitted from the emission surface,
    wherein a surface of the cover on the driver side is formed to be rougher than another surface of the cover.

3. The steering wheel according to claim 1, further comprising:
    a cover that is disposed between the light guide body and the covering portion and is configured to transmit light emitted from the emission surface; and
    a light diffusion sheet that is disposed between the cover and the covering portion, wherein at least a surface of the light diffusion sheet on the driver side is formed to be rougher than a surface of the cover on the driver side.

* * * * *